Figure 1:
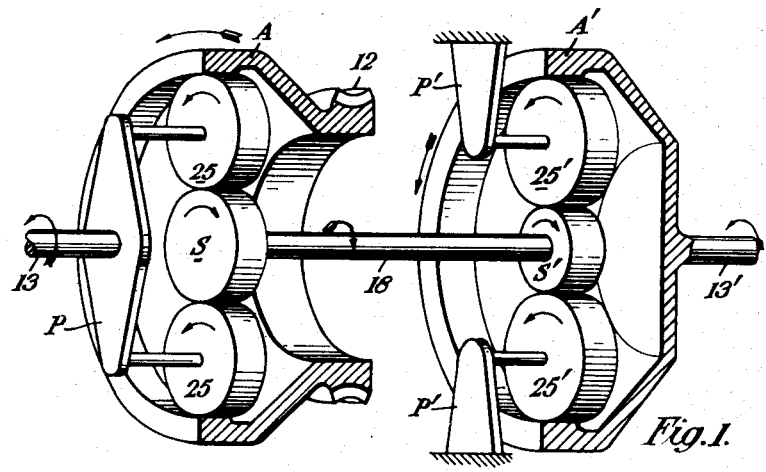

Aug. 11, 1953 R. H. WILSON 2,648,236
DRIVING GEAR FOR THE DRIVEN AXLES OF VEHICLES
Filed Dec. 22, 1949 4 Sheets-Sheet 1

INVENTOR
Ronald H. Wilson
By Watson, Cole, Grindle & Watson

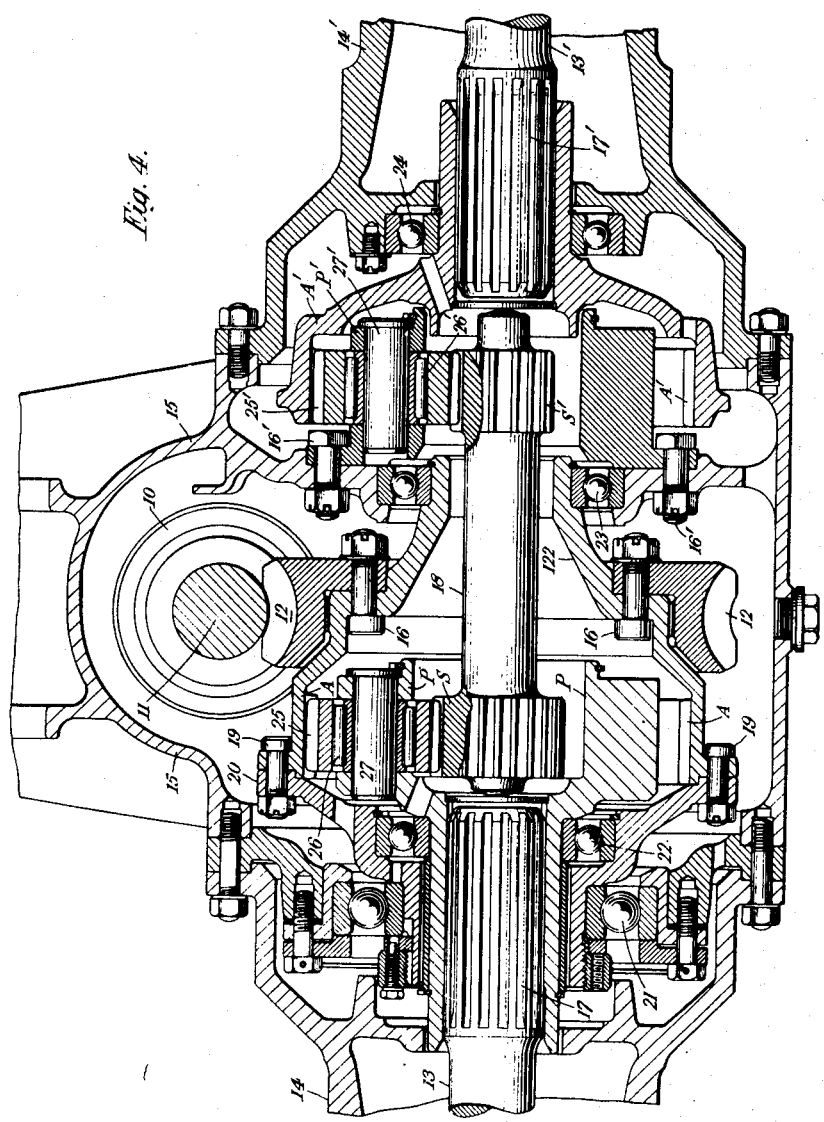

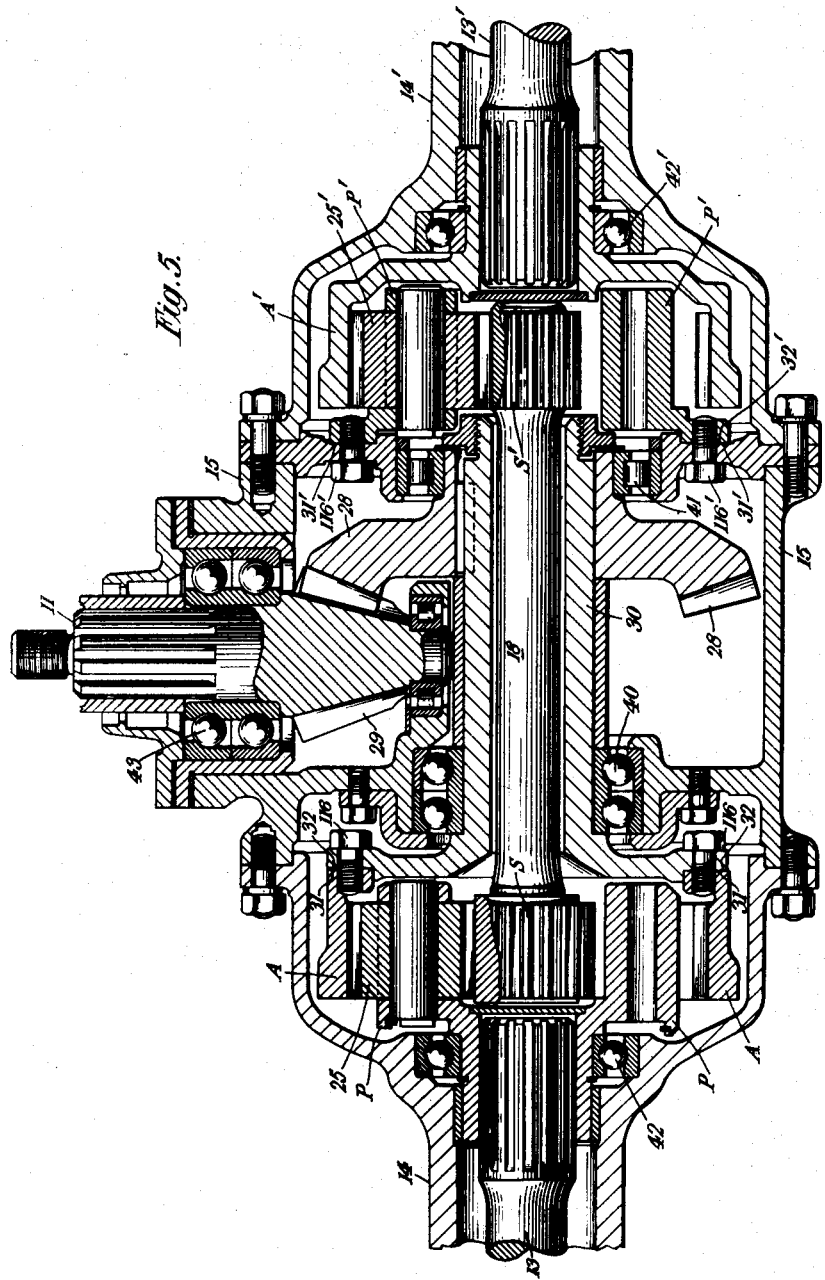

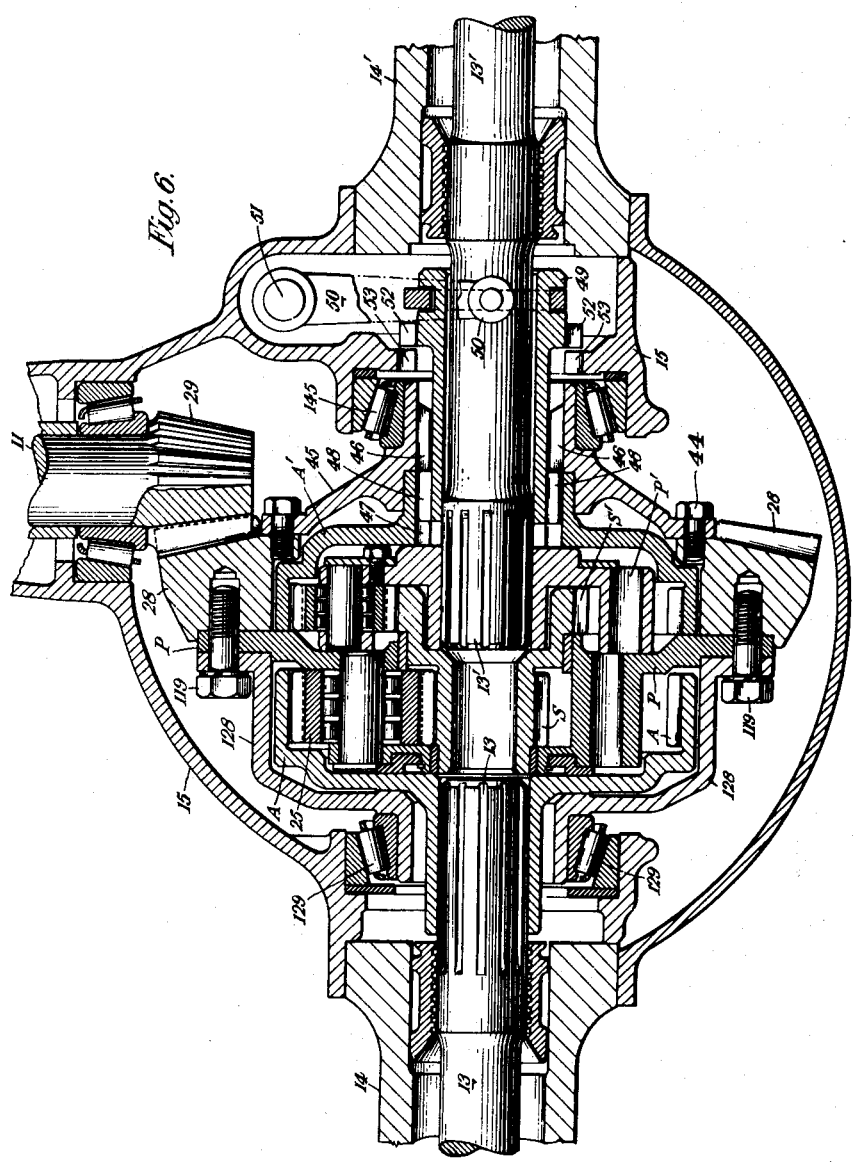

Patented Aug. 11, 1953

2,648,236

UNITED STATES PATENT OFFICE 2,648,236

DRIVING GEAR FOR THE DRIVEN AXLES OF VEHICLES

Ronald Holdsworth Wilson, Leeds, England, assignor, by mesne assignments, to Kirkstall Forge Engineering Limited, Kirkstall, Leeds, England Application December 22, 1949, Serial No. 134,474
In Great Britain January 31, 1949

7 Claims. (Cl. 74—694)

In the case of heavy commercial motor road vehicles, such for example as a truck, motor omnibus or trolleybus, the driven axles are frequently of the double reduction type, as otherwise the overall size of the axle centre is excessive.

With larger vehicles, however, it is impracticable to use hub reduction gearings as it is not possible to dispose the large gear wheels required within the dimension over which a standard sized road wheel will pass.

The present invention aims to achieve a two stage reduction at the axle centre while retaining the dimensions of the axle centre at a reasonable figure. This is achieved, by using, for the second stage of the reduction, gearing which normally operates to drive the wheels at the same, or substantially the same speed and torque but which also permits of differential movement of the wheels.

The invention accordingly provides, in or for a motor road vehicle, a driven axle having, at the axle centre, a double reduction gear, the second stage of which is constituted by gearing arranged, in addition to providing the required reduction, to operate as a differential gear.

The main advantage of this is simplification of construction, the normal differential gear being eliminated, and a resulting saving in weight and cost. The arrangement according to the invention enables me to obtain a large torque capacity in a small space with a result that I obtain more ground clearance and more body clearance. The loading platform of the vehicle can be kept as low as possible, thereby giving greater stability due to the low centre of gravity.

The driven axle according to the invention comprises a pair of live axles, each for imparting the drive to one of the road wheels, a first reduction gear at the axle centre, and a pair of gear trains at the axle centre which drive the live axles at substantially equal torque while allowing of differential movement thereof, one of said gear trains receiving the drive from the first reduction gear, driving one of the live axles directly and driving the other live axle through the other gear train.

I may use a bevel drive as the first reduction stage. However, a worm drive may find useful application in many cases in place of the bevel drive and the worm drive is of advantage in the case of a six wheeled vehicle having a pair of adjacent driven axles. Where a bevel drive is used, the gears may be plain bevels, spiral bevels or hypoid gears.

Certain embodiments of driven rear axle according to the invention will now be described in detail, by way of example, with reference to the accompanying drawings. It will be appreciated, however, that the invention is also applicable to driven front axles and to steering and driven axles since, in the latter case, universal joints may be incorporated in the live axles.

Figure 2:
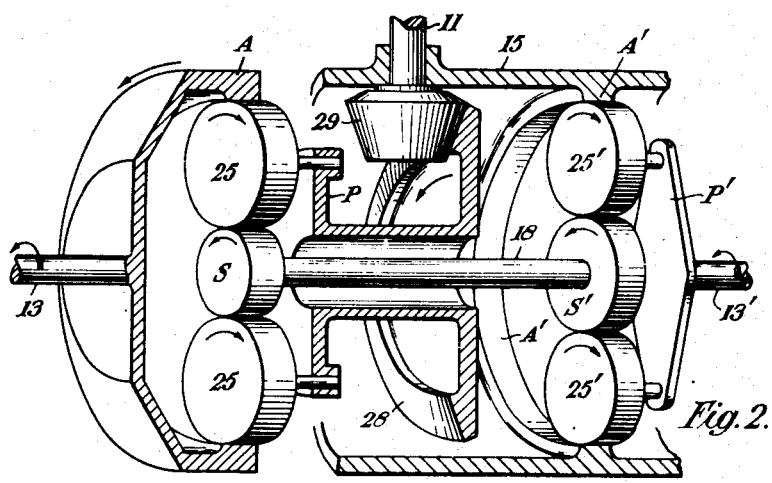
Figure 3:
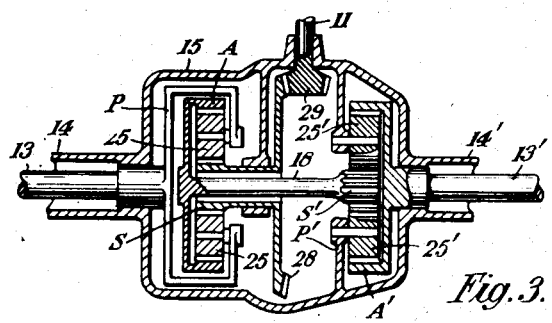

In the drawings,

Fig. 1 is a diagrammatic perspective view, looking from the rear, of one form of axle according to the invention, Fig. 2 is a similar view of a different arrangement, Fig. 3 is a diagrammatic sectional plan of a third form of axle, Fig. 4 is a vertical section, looking from the rear, of a practical form of axle constructed in accordance with the diagram of Fig. 1, Fig. 5 is a similar view of another form of axle, which is reversible so that it can operate in accordance either with the diagram of Fig. 1 or with that of Fig. 2, and Fig. 6 is a similar view of a two-speed axle constructed in accordance with the diagram of Fig. 2.

Like reference characters designate like parts throughout the figures.

In all of the examples illustrated, the axle includes, for the second stage of the reduction, a pair of gear trains, one receiving the drive from the first reduction stage and driving one of the live axles, and the other being driven from the first train and driving the other live axle. Each gear train consists of a wheel, a pinion carrier and an annulus. The two gear trains may be arranged in three alternative ways, viz.

(a) As shown in Figs. 1 and 4.
(b) As shown in Figs. 2 and 6.
(c) As shown in Fig. 3.

Considering first the case shown in Figs. 1 and 4, the first stage of the reduction is provided by a worm 10 on the transmission shaft 11 which meshes with a worm wheel 12. The second stage of the reduction is effected by gearing, through which the drive is transmitted to the near side and offside live axles 13, 13'. These live axles are accommodates, in conventional fashion, within the hollow arms 14, 14' of an axle casing 15, and carry at their outer ends the road wheels (not shown).

The gearing employed comprises a first gear train, comprising an internally toothed annulus A, a planet carrier P and a wheel S which imparts the drive directly from the worm wheel 12 to the live axle 13, and which drives the other live axle 13' through a second and similar gear train consisting of an internally toothed annulus A', a pinion carrier member P' and a wheel S'.

As will be clear from Fig. 4, the worm wheel 12 is attached by bolts 16 to the annulus A, the planet carrier P is attached by a splined connection 17 to the live axle 13, the wheel S is connected by a shaft 18 to the wheel S', the two wheels S, S' being fixed to this shaft so that they rotate as one, the member P' is connected by bolts 16' to the axle casing 15 and the annulus A' drives the live axle 13' through a splined connection 17'.

Attached to the annulus A by bolts 19 is a part 20 which rotates in a ball bearing 21 in relation to the axle casing 15 and which supports a ball bearing 22 for the planet carrier P. The right hand extension 122 of the annulus A rotates in relation to the axle casing in a ball bearing 23, and the annulus A' rotates in relation to the axle casing in a ball bearing 24.

The planet carrier P and the member P' each carries three pinions 25, 25' respectively. Each pinion 25 can turn on a roller bearing 26 in relation to a pin 27 supported by a planet carrier P, and similar parts 26', 27' are associated with each of the pinions 25' on the member P'. Only one pinion of each set is seen in the sectional view of Fig. 4, and for simplicity two pinions only of each set are shown in the diagram of Fig. 1.

The first train is a 3 to 1 train, the annulus A having 72 teeth and the wheel S 24 teeth. Each of the planet pinions 25 has 24 teeth. The second train is a 4 to 1 train, the annulus A' having 72 teeth and the wheel S' 18 teeth. Each of the pinions 25' has 27 teeth.

Turning now to Fig. 1, and assuming a forward input torque of 3 units applied to the annulus A, the wheels of the first train will rotate in the directions shown by the arrows and the reaction torque in the other two members will be—

(i) A forward torque of 4 units in the planet carrier P and live axle 13,
(ii) A backward torque of 1 unit in the wheel S and shaft 18.

The torque in the shaft 18 is too small, and in the wrong direction, for the live axle 13', and the second train reverses and multiplies the torque, producing a forward torque of 4 units in the live axle 13', i. e. a torque equal to, and in the same direction as, that applied to the other live axle 13.

When the parts of the two trains are arranged as shown in Fig. 1, it is necessary, in order that equal torque in the same direction shall be applied to each live axle, that $$\frac{A'}{S'}=\frac{A}{S}+1$$

this formula being fulfilled by the 3:1 and 4:1 trains used in the example just described. I do not, however, wish to limit the invention to achieving precisely equal torque on both road wheels. It may, in some cases, be desirable to apply to the nearside road wheel a torque which slightly exceeds (e. g. by about 1%) that applied to the offside wheel. The number of teeth required for each pinion is defined by the formula $$n=\frac{A-S}{2}$$

this applying to both trains. The total output torque derived, in the case of Fig. 1, from an input torque of 3 units is 8 units, the reduction ratio therefore being 8/3, i. e. 2.66.

Turning now to Fig. 2 it will be noted that, in this case, the drive is supplied, by a bevel gear 28 meshing with a bevel pinion 29 on the transmission shaft 11, to the planet carrier P of the first train, the annulus A being coupled to the live axle 13 and the wheel S, as before, to the wheel S' of the second train. In this case the shaft 18 coupling the two trains revolves in the same direction as the live axle 13 and not in the reverse direction, as previously. It is consequently necessary to keep the direction of rotation the same in the second train and therefore to connect the pinion carrier P' to the live axle 13' and to fix the annulus A¹ to the axle casing.

If a 4:1 train is used for the first train and a 3:1 train for the second train, equal torque in the same direction will be imparted to both live axles.

Thus, assuming a forward input torque of 5 units is applied to the planet carrier P, this will produce a forward torque of 4 units in the live axle 13 and a forward torque of 1 unit in the shaft 18. The second train transforms this latter torque into a forward torque of 4 units on the live axle 13'. The gear ratios required for equal torque in the same direction on the two road wheels with this combination is $$\frac{A}{S}=\frac{A'}{S'}+1$$

a condition fulfilled by the above arrangement. The number of teeth for each pinion is again defined, for each train, by the formula $$n=\frac{A-S}{2}$$

In this case, an input torque of 5 units, produces a total output torque of 8 units, so that the overall reduction is 8/5=1.6.

It will be noted that the arrangements of Fig. 1 and Fig. 2 are generally similar, but the positions of the input from the first reduction stage and the reactants of the fixed member on the axle casing are interchanged, the pinions of the second train in Figure 1 being not planetary. Advantage may be taken of this fact, as shown in Fig. 5, to obtain an axle in which the second stage reduction is variable by removing the gearing and recoupling it in reversed relationship to the rest of the mechanism.

The mechanism is shown, in Fig. 5, arranged as indicated in Fig. 1, the left hand epicyclic train A, P, S having a 3:1 ratio and the right hand train A', P', S' having a 4:1 ratio. The driven bevel wheel 28 of the first reduction stage is keyed to a sleeve 30 bolted by bolts 116 to the annulus A, and the member P' is secured to the axle casing by bolts 116'. As shown, therefore, the second stage reduction is 2.66/1. Bearings 40, 41 are provided for the sleeve 30 and bearings 42, 42' are provided for the planet carrier P and annulus A¹ respectively. The transmission shaft 11 turns in a bearing 43.

The facing 31 on the annulus A, and co-operating face 32 on the sleeve 30, are however identical with and in corresponding positions to the facing 31' on the axle casing and the co-operating face 32' on the member P'.

If therefore the bolts 116, 116' are removed, and the mechanism turned over and reattached to the axle, the 4:1 train A', P', S' being now on the left, with its member P' bolted by the bolts 116 to the sleeve 30, and the 3:1 train A, P, S being now on the right, with its annulus bolted by the bolts 116' to the axle casing, the axle has been converted to the arrangement of Fig. 2 and provides a second stage reduction of 1.6/1.

This possibility of interchanging the two trains is of value, as it permits a complete range of ratios, between 4/1 and 12/1 overall reduction, to be provided with a comparatively small variation in the pitch circle diameter of the bevel pinion 29 of the first reduction stage. The same basic axle construction can thus be used for trolley buses, which require a reduction of 11½/1, and fast inter-city coaches, which require a reduction of about 4½/1, the only variation needed to achieve these extreme requirements being a change in the wheels 29, 28 constituting the first reduction stage. As will be seen, there is ample space in the axle casing to accommodate the small change in pinion pitch circle diameter required to cater for the two extreme cases. In the case of the 11½/1 reduction, a first stage reduction gear giving a reduction of about 4½/1 would be used with the gearing arranged as shown in Fig. 5 and giving a reduction of 2.66/1. To obtain an overall reduction of as little as about 4½/1, the gearing could be changed to the position reverse to that of Fig. 5, giving a reduction of 1.6/1, when a first stage reduction of about 3/1 would be needed. It is clear therefore that no large change in the reduction produced by the first reduction stage is necessary despite the wide range of overall reduction to be catered for.

To facilitate comparison with the other figures, the input has been shown applied to Fig. 5 on the same side as the live axle 13 driving the near side wheel. For the wheels to rotate in the correct direction this will necessitates rotation of the transmission shaft 11 in the counter-clockwise direction, as seen from the front, instead of the clockwise direction as is orthodox practice. If, in the vehicle to which the axle is fitted, the transmission shaft 11 rotates clockwise, as seen from the front, the arrangement in practice would be the mirror image of Fig. 5.

A variation of the arrangement in Fig. 2 is shown in Fig. 6. Here the bevel wheel 28 of the first reduction stage is coupled by bolts 119 to the planet carrier P of the first train, and to an extension 128 which rotates in bearings 129. The bevel wheel 28 is also connected, by bolts 44, to a member 45 formed with dogs 46, and mounted in a bearing 145. The annulus A of the first train is coupled to the live axle 13, and the wheels S, S' have a unitary hub. The carrier P' of the second train is fixed to the live axle 13' and the annulus A' of the second train has dogs 47 which engage dogs 48 on a sleeve 49 which is shiftable by means of an arm 50 on a control shaft 51 from the neutral position shown.

If the sleeve 49 is moved to the left, dogs 52 thereon are brought into engagement with dogs 53 on the axle casing 15, and the annulus A' is consequently locked to the axle casing, as in the case of the arrangement shown in Fig. 2.

If, however, the sleeve 49 is moved to the right, the dogs 48 constitute a coupling between the dogs 47, 46 and the annulus A' is thus coupled to the bevel wheel 28 and planet carrier P, giving a direct drive.

Assuming that the first train has a ratio of 3:1 and the second train a ratio of 2:1, which conforms to the above quoted formula, for Fig. 2, of $$\frac{A}{S} = \frac{A'}{S'} + 1$$

and that there is an input torque of 4 on the bevel wheel 28, then with the sleeve 49 shifted to the left, the torque in each live axle will be 3 and in the two wheels 1, while the reaction torque on the fixed annulus A' will be 2. The speed reduction in the gearing is thus 6/4=1.5.

When, however, the sleeve 49 is shifted to the right to couple the annulus A' to the planet carrier P, the equality of torque in the two live axles is unaffected. As stated above, there is a direct drive, but the gearing can nevertheless function as a differential gear.

The total input torque is now 6 units, i. e. 4 from the bevel wheel 28 and 2 units from the annulus A', while the total output torque remains 6 units, the epicyclic portion of the mechanism giving a 1:1 drive.

In the arrangement shown in Fig. 3, the driving bevel gear 28 is fixed to the wheel S of the first train, the planet carrier P is attached to the live axle 13, the annulus A is fixed to the shaft driving the wheel S' of the second train, the member P' is fixed to the axle casing and the annulus A' drives the live axle 13'.

What I claim as my invention and desire to secure by Letters Patent is:

1. A driven axle for a motor road vehicle, comprising an axle casing, a pair of live axles in the axle casing, gears in the axle casing providing a first reduction stage, first and second gear trains in the axle casing providing a second reduction stage and arranged to drive the live axles at substantially equal torque while allowing of differential movement thereof, each of said gear trains comprising three components; namely, a wheel, a pinion carrier and an internally toothed annulus; one component of the first gear train being driven from the first reduction stage, another component of the first gear train driving one of the live axles and the third component of the first gear train driving the wheel of the second gear train, and another component of said second gear train driving the other live axle, and means for securing the third component of said second gear train to the axle casing.

2. A driven axle for a motor road vehicle, comprising an axle casing, a pair of live axles in the axle casing, gears in the axle casing providing a first reduction stage, first and second gear trains in the axle casing providing a second reduction stage and arranged to drive the live axles at substantially equal torque while allowing of differential movement thereof, each of said gear trains comprising three components; namely, by a wheel, a pinion carrier and an internally toothed annulus; the annulus of the first gear train being driven from the first reduction stage, the pinion carrier of the first gear train being attached to one of the live axes and the annulus of the second gear train being attached to the other live axle, a shaft fixed to the wheels of the two gear trains, and means for connecting the pinion carrier of said second gear train to the axle casing.

3. A drive axle for a motor road vehicle, comprising an axle casing, a pair of live axles in the axle casing, gears in the axle casing providing a first reduction stage, first and second gear trains in the axle casing providing a second reduction stage and arranged to drive the live axles at substantially equal torque while allowing of differential movement thereof, each of said gear trains comprising three components; namely, a wheel, a pinion carrier and an internally toothed annulus; the annulus of the first gear train being attached to one of the live axles, the pinion carrier of the first gear train being driven from the first reduction stage, and the pinion carrier of the second gear train being attached to the other live axle, a shaft fixed to the wheels of the two gear trains, and means for connecting the annulus of said second gear train to the axle casing.

4. A driven axle for a motor road vehicle, comprising an axle casing, a pair of live axles in the axle casing, gears in the axle casing providing a first reduction stage, first and second gear trains in the axle casing providing a second reduction stage and arranged to drive the live axles at substantially equal torque while allowing of differential movement thereof, each of said gear trains comprising three components; namely, a wheel, a pinion carrier and an internally toothed annulus; the annulus of the first gear train being attached to one of the live axles, the pinion carrier of the first gear train being driven from the first reduction stage, and the pinion carrier of the second gear train being attached to the other live axle, a shaft fixed to the wheels of the two gear trains, and means for connecting the annulus of said second gear train at will either to the axle casing or to the pinion carrier of the first gear train for rotation therewith.

5. A driven axle as claimed in claim 4, wherein said coupling means comprise a slidable sleeve coupled to rotate with the annulus of the second epicyclic train and having thereon dogs which serve to couple the sleeve either to the axle casing or to the pinion carrier of the first epicyclic train, according to the position of axial adjustment of the sleeve.

6. A drive axle as claimed in claim 2, in which the gear trains are mounted within the axle casing by bolts which respectively secure the annulus of the first gear train to a member coupled to the first reduction stage and the pinion carrier of the second gear train to the axle casing, said gear trains conforming approximately to the formula $$\frac{A}{S} = \frac{A'}{S'} - 1$$

where A, A', S, and S' are respectively the number of teeth on the annulus of the first train, the annulus of the second train, the wheel of the first train and the wheel of the second train, and the gear trains being removable from the axle casing, by undoing the bolts, and mountable therein in reversed relationship, with the pinion carrier of what was previously the second train attached by the bolts to the member coupled to the first reduction stage and with the annulus of what was previously the first train attached by the bolts to the axle casing.

7. A driven axle for a motor road vehicle, comprising an axle casing, a pair of live axles in the axle casing, gears in the axle casing providing a first reduction stage, first and second gear trains in the axle casing providing a second reduction stage and arranged to drive the live axles at substantially equal torque while allowing of differential movement thereof, each of said gear trains comprising three components; namely, a wheel, a pinion carrier and an internally toothed annulus; the annulus of the first gear train being coupled to the wheel of the second gear train to rotate as one with it, the wheel of the first gear train being driven from the first reduction stage, the pinion carrier of the first gear train being attached to one live axle and the annulus of the second gear train being attached to the other live axle, and means for connecting the pinion carrier of said second gear train to the axle casing.

RONALD HOLDSWORTH WILSON.

References Cited in the file of this patent

UNITED STATES PATENTS

| Number | Name | Date |
|---|---|---|
| 1,246,155 | Pillmore | Nov. 13, 1917 |
| 1,278,295 | Bernhard | Sept. 10, 1918 |
| 1,361,731 | Jayne | Dec. 7, 1920 |
| 1,553,147 | Dodge | Sept. 8, 1925 |
| 2,075,980 | Fawick | Apr. 6, 1937 |
| 2,108,366 | Cassagne | Feb. 15, 1938 |
| 2,314,664 | Shenstone | Mar. 23, 1943 |

FOREIGN PATENTS

| Number | Country | Date |
|---|---|---|
| 881,038 | France | Apr. 13, 1943 |